Aug. 30, 1966          H. L. KRAUSE          3,269,301
                    FRUIT JUICE EXTRACTION
Filed May 20, 1964                          4 Sheets-Sheet 2

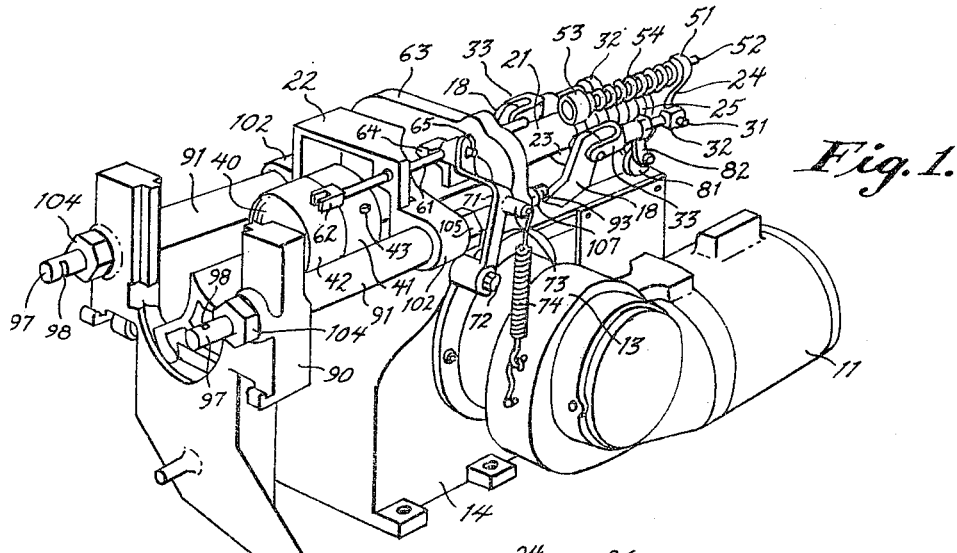
Fig. 1.
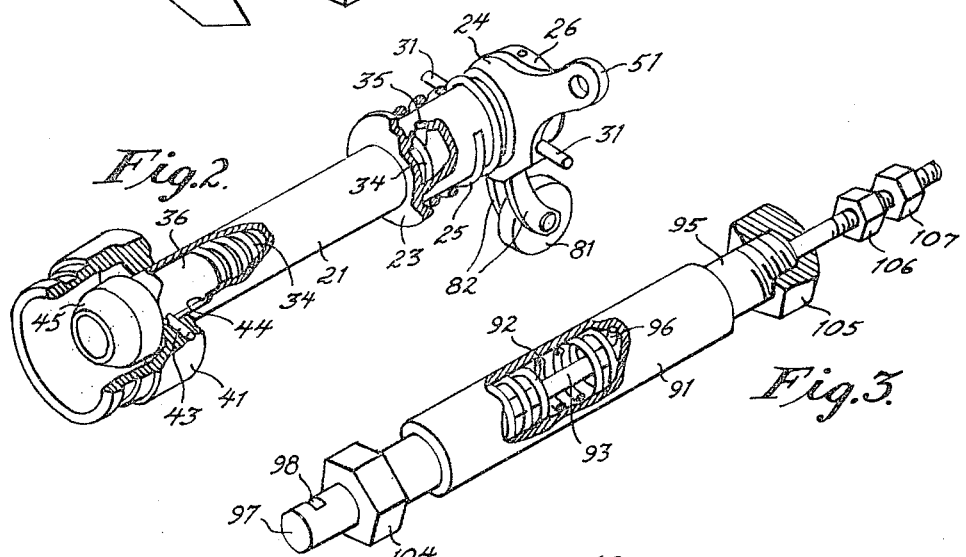
Fig. 2.
Fig. 3.
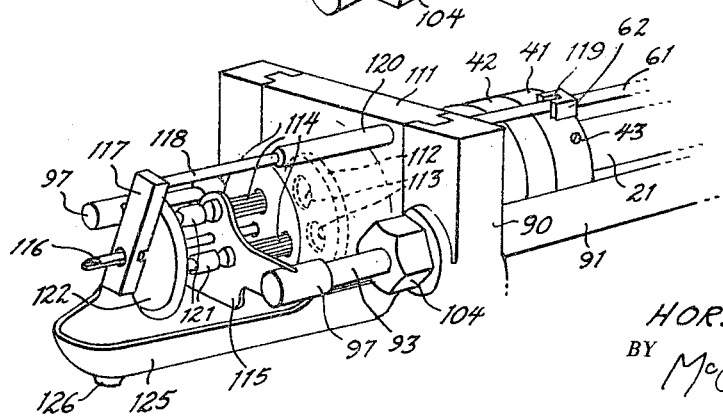
Fig. 4.
INVENTOR.
HORST L. KRAUSE
BY McClure & Weiser
ATTORNEYS.

INVENTOR.
HORST L. KRAUSE
BY McClure & Weiser
ATTORNEYS.

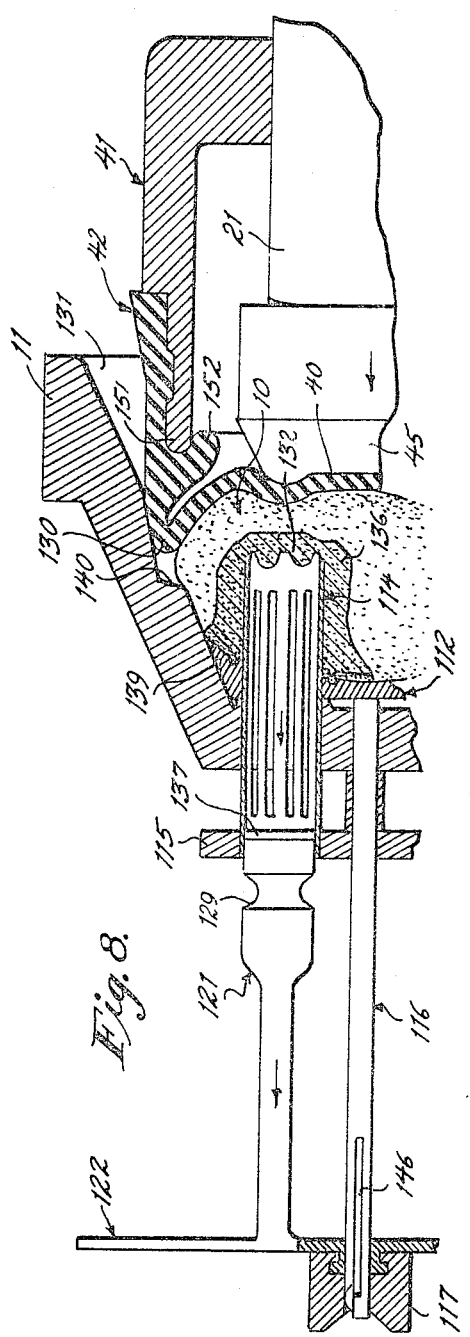
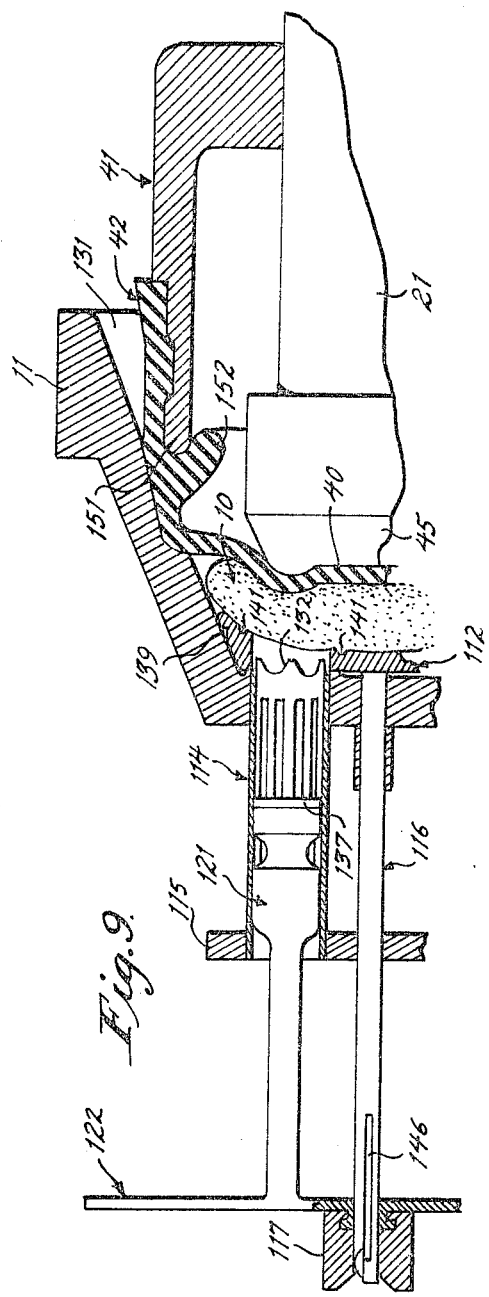

INVENTOR.
HORST L. KRAUSE
BY McClurg + Weiser
ATTORNEYS.

United States Patent Office 3,269,301
Patented August 30, 1966

3,269,301
FRUIT JUICE EXTRACTION
Horst L. Krause, 1040 Foster St., Philadelphia, Pa.
Filed May 20, 1964, Ser. No. 368,809
12 Claims. (Cl. 100—37)

This invention relates to extraction of juice from fruit, especially from whole fruit having a surrounding rind, such as citrus fruit or the like.

Machines and methods are known for extracting juice from rinded fruit by compression of the fruit to express the juice therefrom. One such machine is covered by U.S. Pat. 2,522,800 and another, together with the related method, by U.S. Pat. 3,162,114 of the same inventor. Despite the considerable advance that the inventions covered thereby represented over the prior art, additional improvement has proved desirable to increase the juice yield further and to effect a further reduction in contamination by rind oil, also to modify the piercing and compression of the fruit to increase the time interval between inspection and maintenance periods. Accordingly, the present invention was made and represents an improvement thereover and over the rest of the prior art, being most closely related to the latter of the two mentioned prior inventions, the patent specification of which is incorporated herein by reference for the sake of convenience.

A primary object of the present invention is provision of means and methods for extracting a maximum of juice and minimum of rind oil from rinded fruit by piercing and compression thereof.

Another object is provision of improved means for supporting substantially the entire outside surface of a whole rinded fruit and for compressing the fruit to express the juice therefrom.

A further object is provision of improved means for piercing a rinded fruit and for extracting a piece of rind therefrom before compression of the fruit to express the juice therefrom and for removing the residue of the fruit after compression thereof.

Other objects of the present invention, together with means and methods for attaining the various objects, will be apparent from the following description and the accompanying diagrams.

FIG. 1 is a perspective view of apparatus of this invention with portions thereof omitted or removed in the interest of clarity;

FIG. 2 is a perspective view, on an enlarged scale and partly broken away to show the interior, of part of the apparatus illustrated in the preceding view;

FIG. 3 is a perspective view, similar to FIG. 2, of another previously illustrated part of the same apparatus; and FIG. 4 is a perspective view, on a slightly larger scale than FIG. 1, of part of the same apparatus, together with portions thereof not shown there.

FIG. 8 is another side view, partly in section, of the apparatus components shown in the preceding series of views, now at a stage in which the fruit is undergoing substantial compression and deformation;

FIG. 9 is a similar view at a later stage, when compression of the fruit has been completed;

Figure 5:
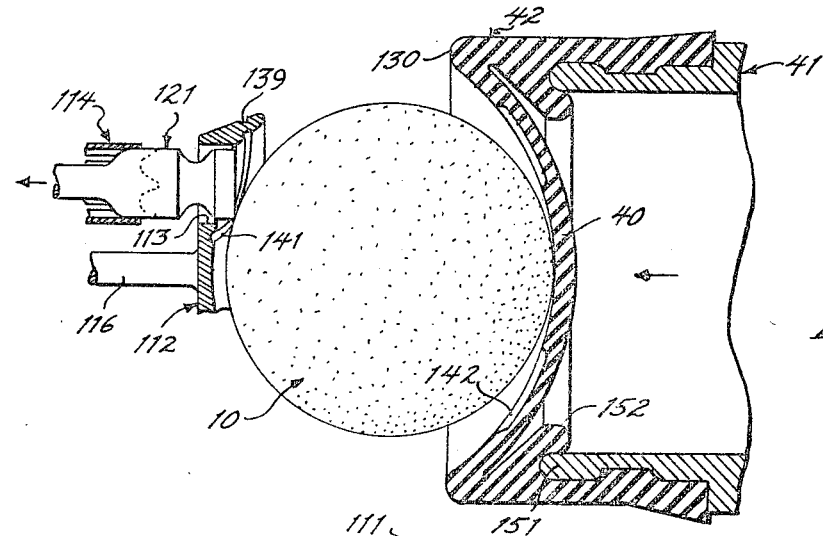
FIG. 5 is a side elevation, partly in section, of opposing components of the apparatus of this invention in position to begin operations upon a whole fruit positioned therebetween.
Figure 6:
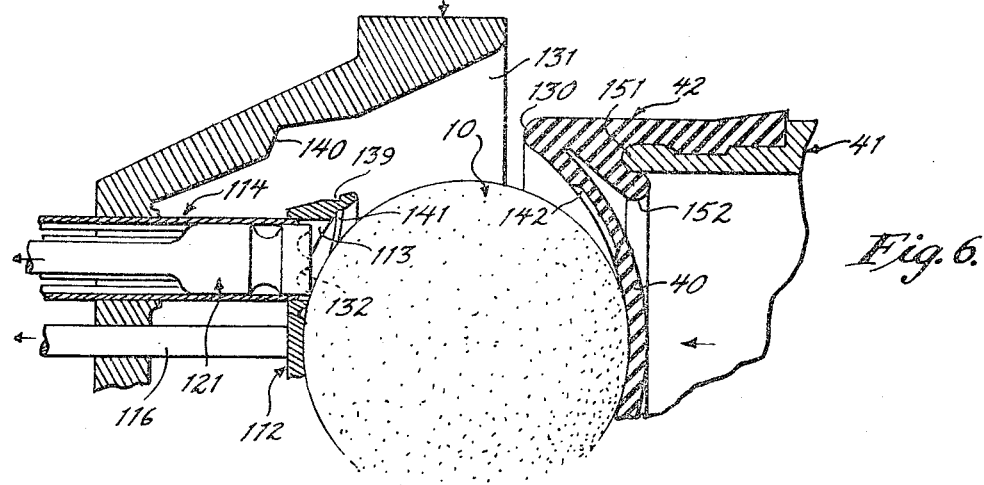
FIG. 6 is a side view similar to FIG. 5 but illustrating the opposing apparatus components at a somewhat later stage in the operations, as the fruit comes into contact with piercing means.

In general, the objects of the present invention are accomplished, in compressive extraction of juice from fruit having a rind, by supporting a whole fruit on opposite sides without significant surface deformation thereof, piercing the rind to open it before the fruit is compressed, enclosing the fruit and supporting essentially all the unpierced surface thereof, and compressing the enclosed and supported fruit to deform it and express juice therefrom through the opening provided therein by the piercing.

This invention provides, in apparatus for compressing fruit to express juice therefrom, opposing compression elements adapted to be juxtaposed by relative movement along a common axis to enclose a whole fruit therebetween and thereby support essentially the entire outside surface thereof, dished means axially movable within one of the compression elements and adapted to cooperate wtih the opposing compression element to hold the fruit for piercing before compression, to aid in compressing the fruit to express juice therefrom, and to eject the compressed fruit residue thereafter, fruit-piercing means axially movable with respect to the dished means and the compression elements, and actuating mechanism for these and related components of the apparatus. These and more detailed features of the invention are illustrated and described below.

FIG. 1 shows, in perspective, apparatus of this invention, including components shown in greater detail in FIGS. 2 and 3 and lacking certain components shown in FIG. 4. The longitudinal axes apparent in these first four views are actually parallel though not necessarily so shown from one view to another. In particular, the components shown in FIG. 2 are found extending upward to the right along the upper middle part of FIG. 1; the components shown in FIG. 3 are found in the left part of FIG. 1 (and, to a lesser extent, mostly at the right of FIG. 4) extending in a like direction at each side of the apparatus. The components shown in FIG. 4, to the extent omitted from FIG. 1, would be located at or near the left end thereof. Subsequent views show further details of certain of the components.

Motor 11 drives yoke 18 to and fro by conventional mechanism (not shown, such as gears, cams, and rollers) contained in housing 13 affixed to frame 14, which itself is normally affixed to a platform or similar support (not shown). The yoke in turn reciprocates plunger mechanism to compress the fruit (shown in subsequent views). Plunger tube 21 rides in fixed bearing bracket 22 upstanding from the frame. Collar 23 affixed to the plunger tube in the vicinity of yoke 18 is spaced from end bracket 24, which is movable along the tube against short compression spring 25 separating the collar from the end bracket. Cap 26 pinned to the far end of the plunger tube prevents the end bracket from sliding off the tube and keeps spring 25 partially compressed. Horizontal stud 31 extends from opposite sides of the end bracket to engage a pair of bored heads 32 on the end of pair of short clevis assemblies 33 pinned to the arms of the yoke.

Inside the plunger tube is long compression spring 34 retrained at the far end by pin 35 through the tube and bearing at the near end against one end of short cylinder 36, which carries holder 41 for resilient cuplike compression element 42 by means of screws 43 (one visible) threaded into the short cylinder through longitudinal slots 44 (one visible) in the plunger tube. Plunger head 45 within the holder is affixed to the near end of the plunger tube.

Extending to the upper right on end bracket 24 is ear 51 bored to receive longitudinal push rod 52, which carries cap 53 on its near end and compression spring 54 between the cap and the end bracket. The far end of the push rod is retained in place by a cotter pin (not shown) on the far side of the bracket. Spaced from the cap but aligned with it and the push rod is ejector linkage rod 61, which has mortise block 62 on the near end, and which protrudes at its far end through an aperture (not shown) in movable transverse bracket 63. This linkage rod also has surrounding it ahead of (nearer the viewer) the movable transverse bracket a stop-pin assembly, which is affixed to the rod. Stop 64 of this assembly extends along the rod toward the far edge of holder 41 for resilient cuplike compression element 42, fixed bracket 22 being recessed to accommodate it. Pin 65 of this assembly extends to the side through an aperture in the upper end of kicker arm 71, which is offset toward the rod, the lower end of the arm being fulcrumed on the frame by bolt 72 extending transversely therefrom. Boss 73 extending transversely from the body of the kicker arm retains one end of extension spring 74, the other end of which is linked to the wall of housing 13. Also carried on end bracket 24 is roller 81, which is supported rotatably by pair of depending supports joined by a pin through the center of the roller. The roller rides on a horizontal face of the frame to support the far end of the plunger tube during its reciprocation.

Supported between fixed transverse bracket 22 and fixed U-bracket 90, which is nearer the viewer, is a pair of tube assemblies flanking the plunger tube for part of its length. Each tube assembly has tube 91 offset to smaller diameter at near and far ends 94 and 95, which extend through bores in respective brackets 22 and 90 and are retained by nuts 104 and 105 threaded thereon. The body of each tube encloses compression spring 92, which surrounds rod 93 for part of its length. The spring bears at its near end on the offset at the narrowed near end of the tube and at its far end against pin 96 through the rod. Cylindrical piece 97 having transverse slot halfway therethrough along one edge terminates the near end of the rod and protrudes from nut 104, while the other end of the rod protrudes through nut 105 and through a suitable bore in movable bracket 63, where it is retained by nuts 106 and 107 threaded onto the rod and against opposite faces of the movable bracket.

In FIG. 4 opposing assembly 111, which was omitted in FIG. 1, is retained by appropriate mortising between the upstanding arms of U-bracket 90. This assembly carries a number of movable elements and has a fixed conical interior face opening away from the viewer. Shown in broken lines as being within frustoconical interior 131 thereof is dished disc 112, which conforms at its peripheral edge to the conical contour and which has circular openings 113 therein to receive cylindrical piercing-excising-straining prongs 114 mounted on plate 115; which is retained in slots 98 in cylindrical pieces 97 on the near ends of rods 93 (shown protruding nearer the viewer here than previously). The conical part of the assembly is apertured to receive the prongs and to receive shaft 116 of the dished disc. Bored near one end to receive the shaft is crossbar 117, which is affixed at its opposite end to one end of rod 118, other end 119 of which fits into mortise block 62 on ejector linkage rod 61, sleeve 120 intervening and surrounding the linkage rod for part of its length. Necked stripper pistons 121 are mounted on plate 122, which surrounds shaft 116 and has a lost-motion connection thereto as subsequently indicated. Drain pan 125 with spout 126 underlies this assembly 111.

The plunger assembly and the opposing assembly are actuated to effect the supporting and enclosure of a whole fruit therebetween and the piercing thereof and excision of pieces of rind therefrom and the compression thereof to express juice therefrom essentially free of rind oil. The compressed fruit residue is ejected from the compression location upon completion of the sequence of operations, as described more fully below.

Figure 10:
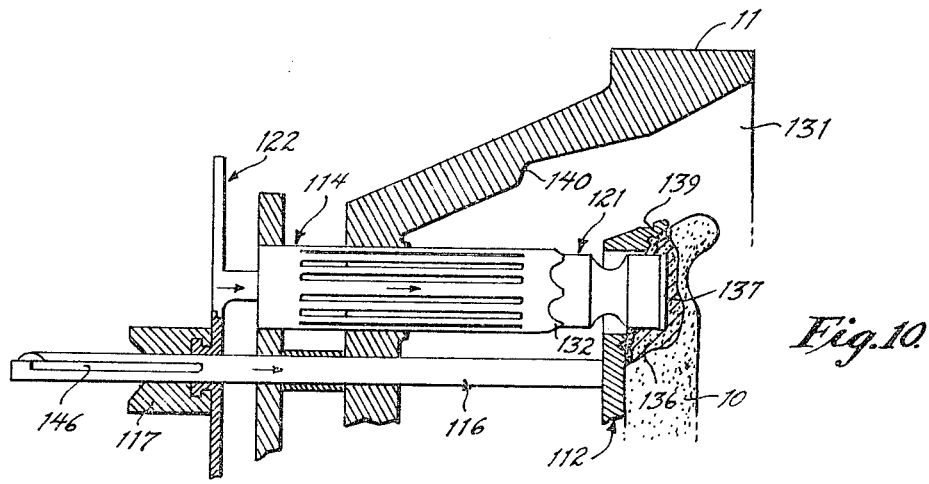
FIG. 10 is a similar view of certain of the same components, from the left part of the preceding views, at a still later stage in the operations, after compression of the fruit and preparatory to ejection of the compressed fruit residue.
Figure 11:
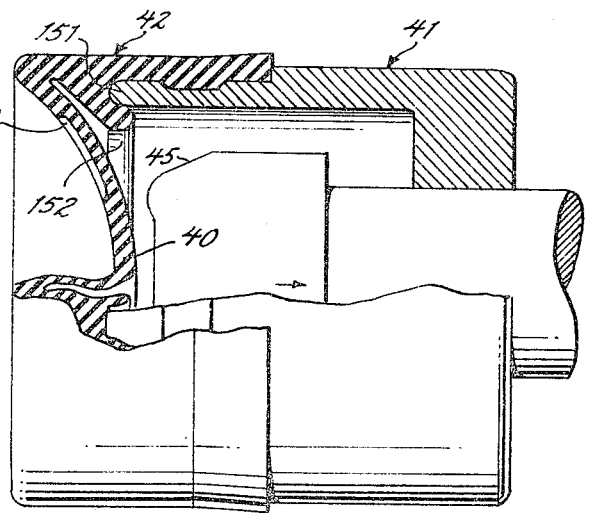
FIG. 11 is a similar view taken at the same stage as FIG. 10 and illustrating components from the right part of the preceding sequential views in position for ejection of the fruit residue.

FIGS. 5 through 9 constitute a sequence of views, in side elevation and partly in section, of the compression elements and related components of the apparatus as the above operations are performed upon a fruit, throughout completion of the compression. FIGS. 10 and 11 show in similar manner the location of the opposing and plunger assemblies, respectively, after compression and preparatory to ejection of the fruit residue. Superimposed arrows indicate directions of movement of the various items of apparatus to and fro along the longitudinal axis, which passes horizontally through the center of the fruit as shown in these views. The phasing of respective movements by the actuating mechanism is described with reference to preceding and succeeding views.

Whole fruit 10, which is generally spherical in shape, is delivered by means forming no part of the present invention (and, thus, not shown) to the location indicated in FIG. 4, whereupon resilient cuplike compression element 42 carried on holder 41 on the plunger tube (not visible in this view) is advanced (to the left as shown) to juxtapose the concave face of its membranous end portion 40 to one side of the fruit, thereby moving the fruit in the same direction. Such movement brings the fruit into contact with stripper pistons 121 (one visible), which are fully projected in the opposite direction (i.e., toward the plunger assembly and out away from the opposing assembly of which the pistons and surrounding elements are a part). This movement brings the flat end of the stripper pistons flush with the concave face of dished disc 112, whereupon the fruit is supported between the disc and the cuplike compression element. The plunger assembly continues to move the fruit against the pistons and the disc and thereby move them in the same direction, bringing them within generally conical interior 131 of the fixed portion of the assembly and flush with scalloped sharp end 132 (shown in broken lines) of the cylindrical prongs (one visible). Although the dished disc, which thus helps support the fruit as it is moved within the conical interior of the opposing compression element by movement of the plunger assembly, is biased in the opposite direction by extension spring 74 through kicker arm 71 and the interconnecting linkage, the fruit is protected therefrom and, hence, is not deformed to any significant extent before the disc comes to rest against the inside wall. This is accomplished by means of push rod 52, which moves with the plunger assembly, being carried on end bracket 24 and bearing at its end against the free end of ejector linkage rod 61.

Figure 7:
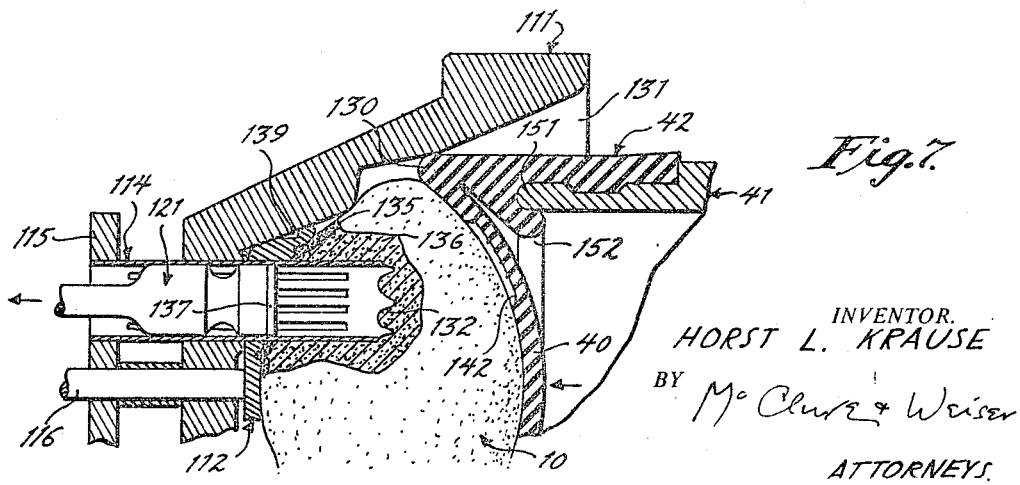
FIG. 7 is a similar view at a later stage in the operations, as the enclosed fruit has been pierced and is partly deformed.

Further movement of the plunger assembly brings peripheral edge 130 of the concave portion of cuplike compression element 42 within conical interior 131 and against the inside wall, enclosing fruit 10 completely and sealing it from the exterior, and the fruit is forced onto prongs 114, which cut through rind 135 and into interior 136 of the fruit. Each prong excises piece 137 of rind, and the piece rests against the flat end of stripper piston 121 now located within the cylindrical prong and about flush with the concave face of dished disc 112, the opposite face of which rests against the frustoconical inner wall defining interior 131. Groove 139 in the latter face of the disc interrupts its contact with the wall and defines an annular hollow when the disc is in this position, as shown in FIG. 7. Prong accommodating openings 113 (one visible) in the disc are each encircled by groove 141

(shown more fully in previous views) in the concave face, into which the rind is forced to seal it thereabout against the escape of rind oil along with the juice. Wider and longer grooves 142 in the concave face of the cuplike compression element trap air, which is compressed therein by the rind as the fruit is compressed to deform it significantly and the compression element is itself deformed, as shown in subsequent views, to aid release from the fruit residue after compression. After the dished disc reaches its rest position, compression spring 54 about push rod 51 takes up the continuing advance of the plunger assembly as push rod 51 can move no further in that direction.

FIGS. 8 and 9, which illustrate later stages in compression of the fruit, also show further details of the supporting means for dished disc 112, cylindrical prongs 114, and stripper pistons 121, as well as plunger tube 21 and head 45, which were outside the last preceding views. As holder 41 advances, peripheral edge 130 of the resilient cuplike compression element carried thereon wedges into the less tapered middle portion of the wall defining conical interior 131 of opposing assembly 111 and against shoulder 140 therein. Continued advance of the plunger tube deforms membranous end portion 40 of cuplike compression element 42, further compressing the fruit, the opposite half of which is supported rigidly by the frustoconical defining wall and dished disc 112 resting thereagainst. As the holder stops and the plunger continues, the holder slides with respect to the plunger tube and against the compression of spring 34 inside the tube (FIG. 2). Additionally prongs 114 retract to prevent scalloped sharp end 132 thereof from piercing the deformed half of the rind; this movement is effected by contact of collar 23 on the moving plunger tube against movable transverse bracket 63, which supports tube assemblies 91 supporting plate 115 on which the prongs are mounted.

Figure 13:
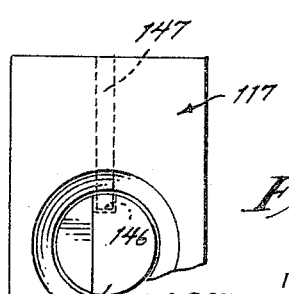
FIG. 13 is an end elevation of other components involved in ejection of the fruit residue.

Upon compression of the fruit the expression of juice therefrom via the openings left by the excision of rind pieces 137, each of which remains against its piston face, forces the pistons to the base of prongs 114, admitting the juice to the prong interior and straining it as it passes through slots 144 in the cylindrical wall and into drain pan 125 therebelow and out spout 126 thereof. Movement of the pistons is permitted by slot 146 in shaft 116 of dished disc 112; plate 122 on which the pistons are mounted is keyed to crossbar 117 as shown and moves with it, and the crossbar has pin 147 extending into the slot, as shown further in FIG. 13. The free end of shaft 116 is cut away from alongside the end of the slot to permit the pin to be inserted slidably in the slot upon rotation of the shaft through a right angle of arc, whereupon prongs 114 enter openings 113 in the dished disc and restrain it and its shaft from further rotation during normal operation.

Neck 129 about each stripper piston provides well defined wiping edges. In the retrograde movement just described, the stripper pistons clear the prong slots and interior of any pulp residue from the previous cycle. As the prongs are forced out of the fruit upon full advance of the plunger tube, the stripper pistons undergo a relatively advancing movement about halfway back through the prongs, the stage shown in FIG. 9, wiping the adjacent portion of the inside wall of the prongs free of pulp, seeds, etc. strained out of the juice just expressed. Subsequently, as described below, the stripper pistons advance further to project ahead of the prongs and into the fruit residue to replace therein the excised pieces of rind, together with any seeds or coarse pulp strained out of the juice.

Figure 12:
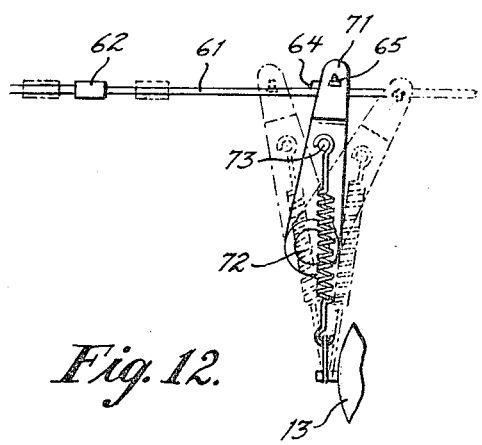
FIG. 12 is a side elevation of certain components involved in ejection of the fruit residue.

Upon withdrawal of the plunger tube to space the plunger assembly from the opposing assembly, preparatory to ejection of the residue of the fully compressed fruit, the various elements of the respective assemblies assume the positions illustrated in FIGS. 10 and 11. Retrograde movement of movable transverse bracket 63 is effected through compression springs 92 contained in tubes 91 mounted on the bracket, as collar 23 on the plunger tube withdraws from its forcible contact with the far surface of the movable bracket. Prongs 114, being mounted on plate 115 carried in slots 98 of pieces 97 carried on rods 93 of the tube assemblies project further into conical interior 131. This movement of the plunger tube moves holder 41 for the resilient cuplike element likewise, and contact of the far edge of the holder with stop 64 on the stop-pin block on rod 61 moves it in the same direction. Corresponding movement of pin 65 on rod 61, which is free to tilt about its axis as the pin travels through an arc in the aperture in the end of kicker arm 71, rotates the arm about fulcrum bolt 72 until extension spring 74, which never got much past dead center (the position of maximum extension) counterclockwise as the plunger tube previously advanced, gets sufficiently past dead center to rotate the kicker arm abruptly clockwise (FIGS. 1 and 12). This projects stripper pistons rapidly forward out of prongs 114 and replaces rind pieces 137, as well as seeds and pulp, inside the fruit residue. As pin 147 strikes the forward end of slot 146 in shaft 116 of dished disc 112, the disc is thrown forward past the end of the pistons and ejects the fruit residue with the rind pieces inside it. Upon contact of stop-pin block with the near face of movable bracket 63, the disc is halted abruptly, but the fruit residue continues moving and thereby frees itself completely to fall into a suitable container (not shown) therebelow. The apparatus is then ready to begin another cycle as the actuating mechanism again reverses the direction of movement of the plunger tube and associated elements.

As shown in FIG. 11, membranous end portion 40 of resilient cuplike compression element 42 resumes its normal configuration, which is concave toward the fruit location, as soon as plunger head 45 withdraws sufficiently to permit that. The cylindrical shape of both holder 41 and the compression element carried thereon is clear from this view. Bumper 152 extends inwardly from the cylindrical outer wall about lip 151 of the holder, just behind the junction of the membranous end portion thereto at peripheral edge 130. The cylindrical walls of the resilient compression element and the holder are offset to mate into place one against the other, thus holding the resilient element securely thereon but permitting ready removal for cleaning or replacement.

Advantages and benefits of the described features of construction and operation of the apparatus and method of the present invention have been mentioned above, and more will be evident from consideration of the description and accompanying illustrations, while others will become apparent and accrue to those undertaking to practice the invention. Although a preferred embodiment has been illustrated and described, modifications may be made without involving a departure from the claimed invention. For instance, parts may be altered in size, shape, or location and may be subdivided or combined while retaining all or some of the advantages and benefits of this invention, as defined in the following claims.

What I claim is:

1. In apparatus for extracting juice from fruit by compression thereof between opposing compression elements adapted to be juxtaposed by relative movement along a common axis to enclose a whole fruit therebetween and thereby support essentially the entire outside surface thereof, dished means axially movable within one of the compression elements between extreme positions contiguous with and spaced from the surface thereof, fruit-piercing means axially movable with respect to the dished means and the compression elements, the means and the adjacent compression element being apertured to receive the piercing means therethrough, an actuating mechanism operatively connected thereto for juxtaposing the opposing compression elements and for advancing and retracting the dished means and the piercing means, the dished means cooperating with the opposing compression element to support a fruit therebetween and said actuating mechanism having means to cause the dished means to retract independently of pressure applied to the fruit so as to preclude significant deformation of the fruit elsewhere than where it is pierced until the dished means is contiguous with the adjacent compression element, the actuating mechanism being phased so that the fruit is both pierced by the piercing means and enclosed by the opposing compression elements before compression.

2. Apparatus according to claim 1, wherein the actuating mechanism comprises means for retracting the dished means into the adjacent compression element and simultaneously advancing the opposing compression element theretoward before compression and for retracting the opposing compression element and simultaneously advancing the dished means after compression, including means for advancing the dished means abruptly to its extreme advanced position to eject compressed fruit residue after retraction of the opposing compression element to space it from the adjacent compression element sufficiently to permit the fruit residue to be ejected from therebetween.

3. In apparatus for extracting juice from fruit by compression thereof between opposing compression elements adapted to be juxtaposed by relative movement along a common axis to enclose a whole fruit therebetween and thereby support essentially the entire outside surface thereof, dished means axially movable within one of the compression elements between extreme positions contiguous with and spaced from the surface thereof, cylindrical fruit-piercing means axially movable with respect to the dished means and the compression elements and having one end sharpened to pierce the fruit and with the cylindrical wall thereof perforate, also including piston means linked to the dished means outside the adjacent compression element and reciprocal axially within the cylindrical wall and forward of the sharpened end, the dished means and the adjacent compression element being apertured to receive the piercing means therethrough, and actuating mechanism operatively connected thereto for juxtaposing the opposing compression elements and for advancing and retracting the dished means and the piercing means, the dished means being adapted to cooperate with the opposing compression element to support a fruit therebetween and to retract while doing so until it is contiguous with the adjacent compression element, the actuating mechanism being phased so that the fruit is both pierced by the piercing means and enclosed by the opposing compression elements before compression.

4. The apparatus of claim 3, wherein the linkage interconnecting the piston means and the dished means permits either to move independently of the other over a portion of the total travel of each, phased by the actuating mechanism so that the forward edges of the piston means and the dished means are essentially aligned during retraction of the dished means, as the opposing compression element advances relative to the adjacent compression element, until the dished means touches the inside surface of the adjacent compression element, whereupon the continued advance of the opposing compression means relative to the adjacent compression means compresses the fruit, the piston means being adapted to be retracted further by the flow of juice therefrom until limited by the interconnection of the dished means.

5. The apparatus of claim 3, wherein the linkage interconnecting the piston means and the dished means permits either to move independently of the other over a portion of the total travel of each, phased by the actuating mechanism so that the forward edge of the piston means is forward of the forward edge of the dished means during retraction of the opposing compression element after compression of the fruit to express the juice therefrom and leave the compressed residue thereof impaled on the piercing means and adjacent the forward edge of the dished means, until the forward edge of the piston means advances past the sharpened end of the piercing means, and into the fruit residue, and the opposing compression element is retracted sufficiently from the adjacent compression element by the actuating mechanism to permit the fruit residue to be ejected from therebetween, whereupon the actuating mechanism abruptly advances the dished means to its extreme advanced position past the forward edge of the piston means until limited by the interconnection therewith and thereby ejects the residue.

6. The apparatus of claim 5, wherein the piercing means is phased by the actuating mechanism to occupy an intermediate position, the actuating mechanism being constructed to advance the forward edges of both the latter means together past the sharpened end of the piercing means before advancing the dished means further than the piston means to eject the compressed fruit residue.

7. In apparatus for compressive extraction of juice from fruit having a rind, cylindrical excising and straining means having one end sharpened and having a perforate cylindrical wall adapted to strain juice passing therethrough, means for wiping the inside surface of the cylindrical means first in one direction with reference to the axis thereof and then in the opposite direction and including a cylindrical piston necked circumferentially intermediate the ends of its cylindrical surface, which fits snugly at both ends within and is adapted to reciprocate axially within the cylindrical excising and straining means and beyond the sharpened end thereof.

8. In apparatus for compressive extraction of juice from fruit having a rind, cylindrical excising and straining means having a perforate cylindrical wall adapted to strain juice passing therethrough, means for wiping the inside surface of the cylindrical means first in one direction with reference to the axis thereof and then in the opposite direction, the wiping means being adapted to retain an excised piece of the rind during compression of the fruit and to replace the piece in the fruit after completion of the compression.

9. In compressive extraction of juice from fruit having a rind, the improvement comprising supporting a whole fruit on opposite sides, excising a piece from the rind by cylindrical excising and straining means adapted to permit juice to pass therethrough, wiping the straining means internally in one direction, straining the excised piece of rind from the juice and replacing it in the fruit after completion of the compression step, and wiping the straining means internally in the opposite direction.

10. In compressive extraction of juice from fruit having a rind, the improvement comprising supporting a whole fruit on opposite sides without significant surface deformation thereof, excising a piece of rind before the fruit is compressed, enclosing the fruit and supporting essentially all the surface thereof except that portion from which a piece of rind was excised, compressing the fruit to expel the excised piece of rind and juice from the fruit, and replacing the excised piece of rind in the fruit after completion of the compression.

11. In compressive extraction of juice from fruit having a rind, the improvement comprising supporting a whole fruit on opposite sides without significant surface deformation thereof, excising a piece of rind before the fruit is compressed, enclosing the fruit and supporting essentially all the surface thereof except that portion from which a piece of rind was excised, compressing the fruit to expel the excised piece of rind and juice from the fruit, replacing the excised piece of rind in the fruit after completion of the compression, and removing the compressed fruit residue with the replaced excised piece of rind therein.

12. In compressive extraction of juice from fruit having a rind, the improvement comprising supporting a whole fruit on opposite sides, excising a piece from the rind, compressing the fruit to expel juice and the excised juice of rind therefrom, straining the excised piece of rind from the juice and replacing it in the fruit after completion of the compression step.

References Cited by the Examiner

UNITED STATES PATENTS

| | | | |
|---|---|---|---|
| 468,341 | 2/1892 | Harris | 100—213 X |
| 1,406,453 | 2/1922 | Fanning | 135—64 X |
| 1,878,899 | 9/1932 | Sherts | 100—211 X |
| 1,889,883 | 12/1932 | Dody | 100—108 |
| 1,922,773 | 8/1933 | Maull | 100—108 X |
| 2,420,681 | 5/1947 | Peterson | 100—37 |
| 2,649,731 | 8/1953 | Polk et al. | 100—108 X |
| 3,162,114 | 12/1964 | Quiroz | 100—49 X |

FOREIGN PATENTS

| | | |
|---|---|---|
| 201,616 | 4/1956 | Australia. |
| 550,154 | 5/1932 | Germany. |

LOUIS O. MAASSEL, *Primary Examiner.*

WALTER A. SCHEEL, *Examiner.*